United States Patent
Sergeev et al.

(10) Patent No.: US 8,437,391 B2
(45) Date of Patent: May 7, 2013

(54) TRANSMITTING VIDEO BETWEEN TWO STATIONS IN A WIRELESS NETWORK

(75) Inventors: Anton Sergeev, Saint-Petersburg (RU); Andrey Turlikov, Saint-Petersburg (RU)

(73) Assignee: Intel Corporation, Santa Clara, CA (US)

( * ) Notice: Subject to any disclaimer, the term of this patent is extended or adjusted under 35 U.S.C. 154(b) by 732 days.

(21) Appl. No.: 12/492,530

(22) Filed: Jun. 26, 2009

(65) Prior Publication Data

US 2010/0329315 A1 Dec. 30, 2010

(51) Int. Cl.
*H04N 11/02* (2006.01)

(52) U.S. Cl.
USPC .............. 375/240.1; 375/240.03; 375/240.14; 375/240.23

(58) Field of Classification Search ............... 375/240.1; 370/458; 714/777
See application file for complete search history.

(56) References Cited

U.S. PATENT DOCUMENTS

| | | | | |
|---|---|---|---|---|
| 4,942,467 | A * | 7/1990 | Waldman et al. | 375/240.14 |
| 6,553,535 | B1 * | 4/2003 | Asada et al. | 714/777 |
| 6,988,236 | B2 * | 1/2006 | Ptasinski et al. | 714/758 |
| 2002/0131506 | A1 * | 9/2002 | Kerofsky et al. | 375/240.23 |
| 2005/0063462 | A1 * | 3/2005 | Lee | 375/240.03 |
| 2005/0141608 | A1 * | 6/2005 | Shin et al. | 375/240.03 |
| 2009/0103646 | A1 * | 4/2009 | Dowling et al. | 375/265 |
| 2009/0285339 | A1 * | 11/2009 | Zhang et al. | 375/343 |
| 2010/0046415 | A1 * | 2/2010 | Kim et al. | 370/315 |
| 2010/0166008 | A1 * | 7/2010 | Hashimoto et al. | 370/458 |

OTHER PUBLICATIONS

Pro Quest output search.*
Google patent output search.*

* cited by examiner

*Primary Examiner* — William C Vaughn, Jr.
*Assistant Examiner* — Luis M Perez
(74) *Attorney, Agent, or Firm* — Trop, Pruner & Hu, P.C.

(57) ABSTRACT

In accordance with some embodiments, a differential frame may be constructed, for example, by differencing frames or using an error prediction method. More frequently and less frequently used values of a differential frame are identified. Symbols with lower and higher transmission energy are identified. The more frequently used values of the differential frame are mapped to the symbols with lower transmission energy to reduce overall energy consumption.

18 Claims, 3 Drawing Sheets

| Value of Diff Frame (decimal [-128 to 127]) | Value of Diff Frame (decimal [0 to 255]) | Input (mapped binary) | Grey coded | QAM Symbol | | Energy |
|---|---|---|---|---|---|---|
| | | | | Modulated (Im) | Modulated (Re) | |

TRANSMITTING VIDEO BETWEEN TWO STATIONS IN A WIRELESS NETWORK

BACKGROUND

Generally, video transmission involves video coding, such as compression, processing, and packetizing a source video. Transmission also involves the actual transmission and the conversion to a radio frequency format which may include channel coding, scrambling, and modulation. Generally, the video coding portion of video transmission is responsible for much of the power consumption of video transmitters. Particularly where the video transmitters are battery based, power consumption may be extremely important.

DETAILED DESCRIPTION

In accordance with some embodiments, the most frequently used values of a differential frame are mapped into the quadrature amplitude modulation (QAM) symbols with the lowest transmission energy. As a result, power consumption of the transmission system may be decreased because low energy modulation symbols are transmitted more frequently than symbols with higher energy levels. It turns out that, in many cases, a high percentage of the image values can be mapped into the lowest energy symbols and transmitted with lower power consumption.

Figure 1:
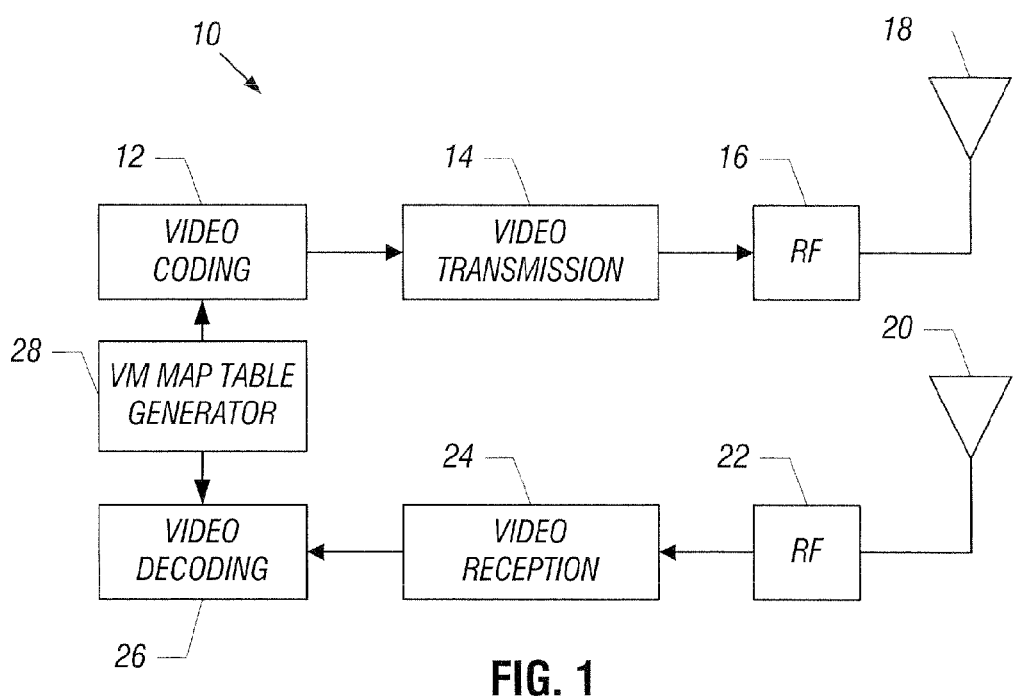
FIG. 1 is a system depiction for one embodiment.

Referring to FIG. 1, an apparatus 10 may be a media player, a personal computer, a set top box, a personal digital assistant, a cellular telephone, or any of a variety of other devices that process video.

The apparatus 10 may include a video coding section 12. The video coding section 12 is responsible for processing and packetizing a source video. A video transmission section 14 does the actual transmission and the conversion to a radio frequency format which may include channel coding, scrambling, and modulation. The actual transmission may be done by the radio frequency section 16, coupled to the antenna 18.

The receiver receives signals on an antenna 20. The received signals are processed by radio frequency section 22 and video reception section 24. The video decoding section 26 is coupled to video reception 24.

Both the video coding and the video decoding sections 12, 26 may be coupled to a VMMAP table generator 28. The VMMAP (source Value to Modulation Symbol MAPping) table generator generates a table that can be used to map the most frequently used values of a differential frame into symbols with the lowest transmission energy. A "differential frame" refers to the set of the resultant symbols after a special transform. For example, when a context prediction is used as the special transform, the symbols are processed one by one. In this case, for successive context-based prediction of the current pixel, only 4 pixels may be used. Therefore, only 2 frame rows are stored (current and previous ones) in one embodiment. There is no whole differential frame at the one instant of time.

VMMAP table generator 28 is optional and it is also possible to use a mapping algorithm to analyze the sizes of the input symbols instead of the frequencies, i.e. source symbols of the differential frame with smaller amplitude are mapped to the channel symbols with smaller energy level. It is possible because approximate forms of probability density functions (PDF) of the differential frame's values are known. A mass estimation campaign shows that for both methods of the differential frame construction, difference between frames and context prediction, the differential frame construction of the PDF is quite close to the two-sided geometrical distribution. In most cases, smaller values have higher frequencies. Therefore, symbols of the differential frames can be mapped to modulation symbols depending on their size, without frequency estimation, or the use of a VMMAP table generator in some embodiments.

The coding and decoding may use any processor-based system, including a general purpose processor-based system, a graphics processor, or a digital signal processor, to mention a few examples. In one embodiment, the processor may be a single instruction multiple data (SIMD) processor.

Figure 2:
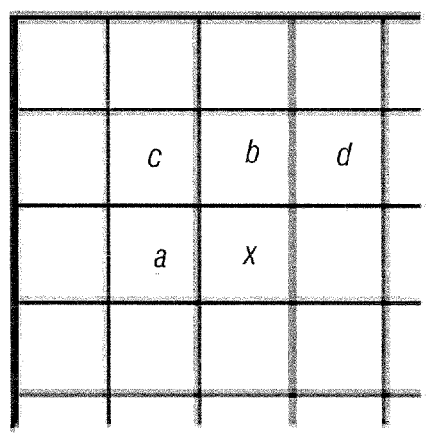
FIG. 2 depicts a causal template used for context modeling and prediction in one embodiment.

Many ways can be used to form the differential frames. The simplest way is to form the differential frame as a result of the difference between two, usually successive, frames in a video sequence. However, in accordance with another embodiment, the differential frame may be the result of an error prediction mechanism such as lossless/near lossless compression standard, Joint Photographic Experts Group (JPEG-LS) ISO International Standard FCD 14495 (Jul. 16, 1997) (lossless and near—lossless compression of continuous-tone still images). In such an approach, a prediction Px of the value lx at the pixel x is determined by the values of Ra, Rb, and Rc at the neighboring pixel positions a, b, and c, as specified in the causal template shown FIG. 2:

```
IF (Rc >= MAX(Ra,Rb))
    Px = MIN(Ra,Rb);
ELSE {
    IF (Rc <= MIN(Ra,Rb))
        Px = MAX(Ra,Rb);
    ELSE
        Px = Ra + Rb - Rc;
}
IF (Px > 255)    Px = 255;
IF (Px < 0)      Px = 0.
```

Then the error prediction may be calculated as a difference between the predicted and real values:

DIFF=$lx-Px$;

Modulo reduction of the prediction error may be accomplished. After this step, DIFF value lies in the range of [−128, 127] for a range of 256 when using QAM 256:

```
IF (DIFF < - ⌊RANGE/2⌋)
    DIFF += RANGE;
ELSE IF (DIFF > - ⌊RANGE/2⌋) -1 )
    DIFF -= RANGE.
```

For simplicity of description, a transmission image with bit depth of 8 bits per pixel is used with QAM 256. However, the number of image values and the modulation point is equal and mapping one-to-one is also possible. But the same ideas can be applied to other QAM systems including QAM 16, 64, 128, etc. Transmission of the video signals of other bit depths, including 12 bits per pixel, is also possible.

Initially, the specific statistical properties of the transmitted video sequence (such as movies or computer graphics) may be considered for better system performance. The differential frames may be made using one of the methods described above. Then, the distribution of values in the differential frames may be estimated. The number of frames may be enough to estimate statistical properties of video sequences. A table (FIG. 6), called a VMMAP table, is built to map input values of differential frames (decimal [−128 to 129] and decimal [0 to +253] to the modulation symbols (Im and Re) and vice versa. The values of the differential frames may be sorted by frequency of appearance. Then the most frequent values are mapped into the symbols with the lowest energy level (see Energy column).

In one embodiment, standard grey coding may be used for better bit error rate. Then the VMMAP table may have one additional column ("Grey Coded") for the corresponding code words of the grey code, as well as a column for "Input (mapped binary)."

Figures 3, 4:
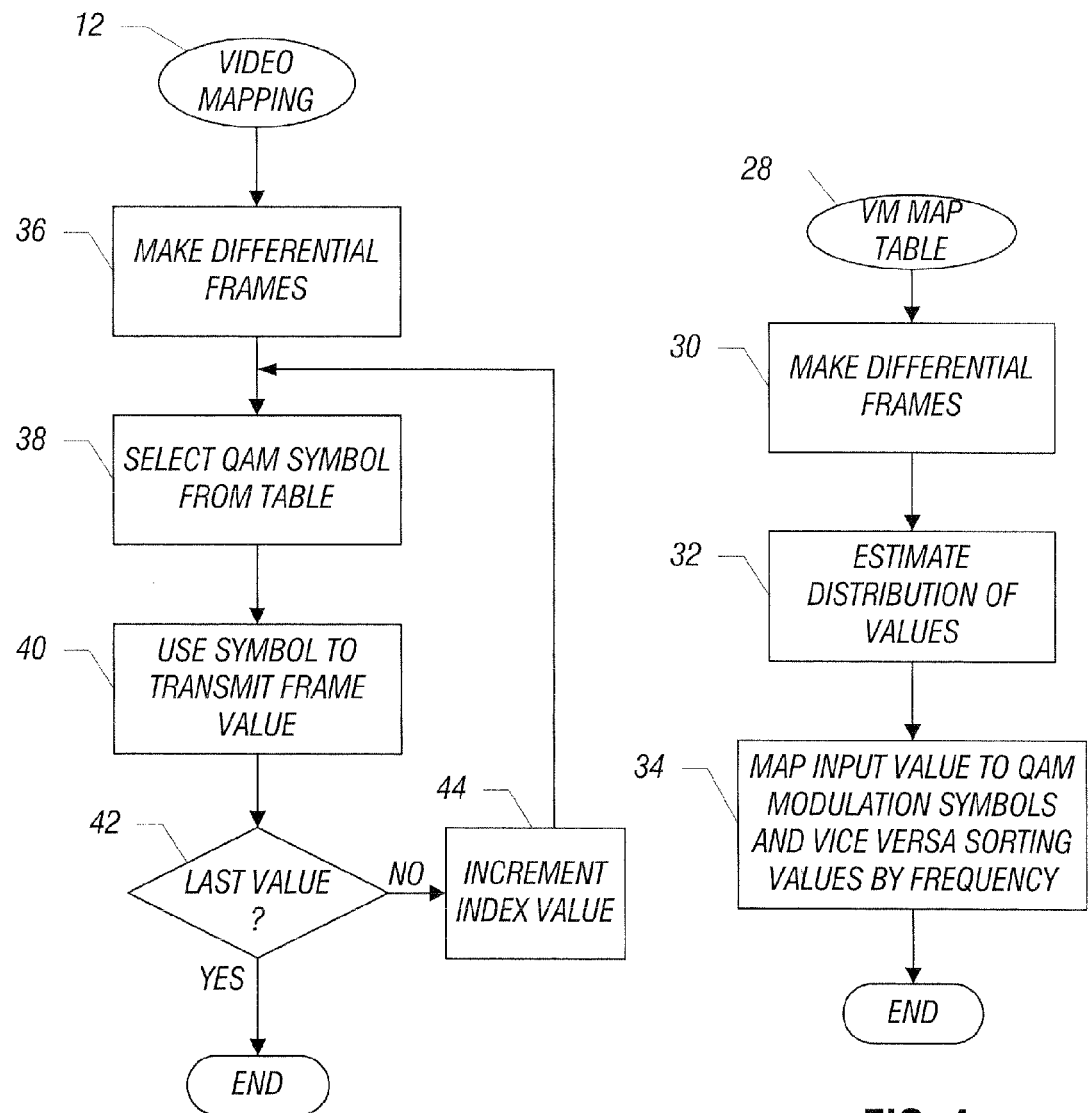
FIG. 3 is a flow chart for video mapping in accordance with one embodiment.
FIG. 4 is a flow chart for a coding sequence in accordance with one embodiment.

The VMMAP table may be formed in software 28, in one embodiment, as depicted in FIG. 4. However, hardware or firmware implementations may also be used. In a software embodiment, a sequence of instructions, stored in a computer readable medium, such as a semiconductor memory, may be executed by a processor, which may be a general purpose processor or a dedicated processor. As indicated in block 30, the differential frames are formed. Then the distribution of values is estimated, as indicated in block 32. Finally, the input values are mapped to the modulation symbols and vice versa, sorting values by frequency, as indicated in block 34.

A first modulation algorithm 12 begins by making the differential frames, as indicated in block 36 in FIG. 3. The algorithm may be implemented in software, firmware, or hardware. In the simplest approach, the difference between two successive frames may be used to make the differential frames. For every value of the differential frame, a QAM 256 symbol is selected according to the VMMAP table, as indicated in block 38. The selected modulation symbol is used for transmissions of frames, as indicated in block 40. A check at diamond 42 determines whether the last value has been analyzed and, if so, the flow ends, but, otherwise, the index value is incremented, as indicated in block 44.

Figures 5, 6:
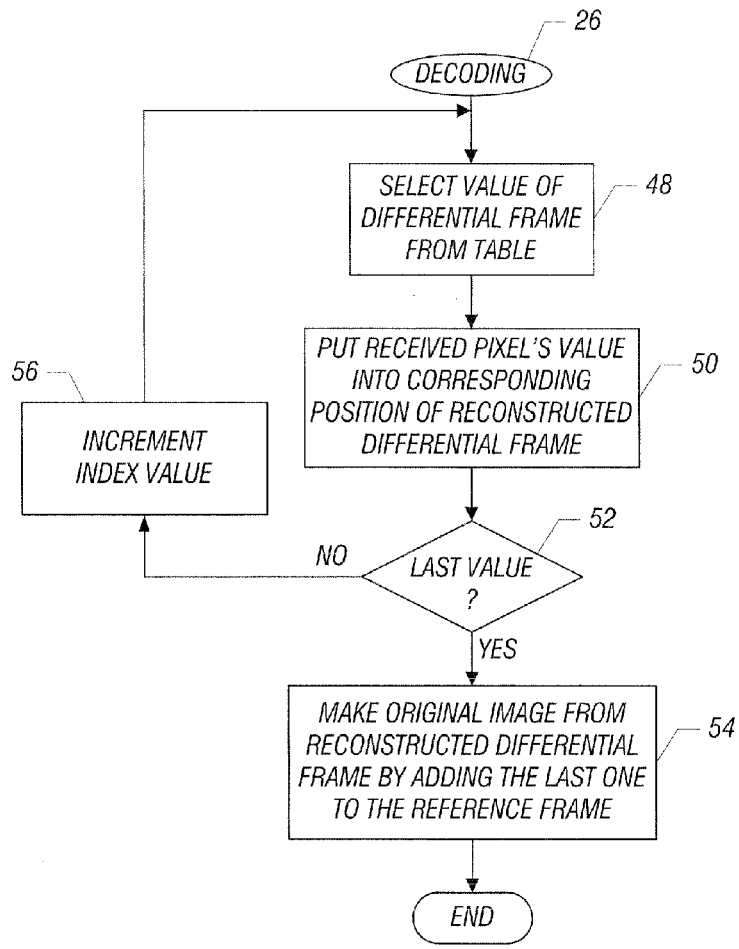
FIG. 5 is a flow chart for a decoding sequence in accordance with one embodiment.
FIG. 6 is a depiction of a VMMAP table format for one embodiment.

Referring to FIG. 5, on the decoder side, the decoding may be implemented by software, hardware, or firmware. In one embodiment, the decoding may be implemented in software instructions stored on a computer readable medium, such as a semiconductor memory. Those instructions may be executed by a general purpose or special purpose processor.

For every received modulation symbol value of a differential frame, a value of the differential frame is selected according to the VMMAP table, as indicated in block 48. That pixel's value is put into the corresponding position of the reconstructed differential frame, as indicated in block 50. A check at diamond 52 determines whether the last value has been analyzed. Then, as indicated in block 54, the original image is made up from the reconstructed differential frame by adding the last one to the reference frame using differential frames construction. If the last value has not been analyzed then an index value is incremented and the flow repeats (block 56).

In some embodiments, the original frame is fully reconstructed on the decoder side. As a result, the proposed video transmission scheme may allow significantly reduced complexity of the video coding part. Full feature compression may not be needed at all and, instead, the coder decoder only uses preprocessing blocks in one embodiment.

In accordance with another embodiment, the JPEG-LS based prediction technique may be used. On the encoding side, for every pixel of an input frame, the value of the current pixel is predicted and a prediction error is calculated. For the prediction error, a symbol is selected according to the VMMAP table. Then, the selected modulation symbol is used for transmission.

On the decoder side, for every received modulation symbol value of a current pixel in a differential frame is calculated by first selecting a value of the prediction error according to the VMMAP table. Then, the value of the current pixel is predicted using the already predicted neighboring pixels using JPEG-LS prediction mechanisms. Then the value of the original pixel is obtained by adding the prediction error to the just predicted value. That reconstruction pixel is put into the corresponding position of the reconstructed frame. The above steps must also be done again for the original frame after doing the differential frame. Then the results of the original frame is fully reconstructed at the decoder side.

In some embodiments, signal-to-noise ratio may be improved in comparison to traditional uncoded QAM 256. Therefore, power consumption may be reduced, in some embodiments, because less energy is needed to deliver video information for the same signal-to-noise ratio. The amount of transmitted video information is the same without preliminary compression.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising: constructing a differential frame; identifying more frequently and less frequently used values of a differential frame;
   identifying symbols with lower and higher transmission energy, wherein identifying the symbols includes identifying the modulation symbols with the lowest transmission energy; and
   mapping the more frequently used values of the differential frame to symbols with lower transmission energy, and wherein identifying the symbols includes identifying the modulation symbols with the lowest transmission energy.

2. The method of claim 1 wherein identifying the values of the differential frame includes identifying the most frequently used values of the differential frame.

3. The method of claim 1 wherein identifying symbols includes identifying quadrature amplitude modulation symbols.

4. The method of claim 1 wherein forming a differential frame includes differencing two successive frames.

5. The method of claim 1 wherein forming a differential frame includes using an error prediction method.

6. The method of claim 5 including using a lossless/near lossless compression technique.

7. The method of claim 1 wherein using a table to identify the values with lower transmission energy and the differential frame values with higher frequency.

8. The method of claim 1 wherein forming the differential frame includes predicting a value of a current pixel and calculating a prediction error for each pixel.

9. A transceiver comprising:
   a video transmission section coupled to a video coding section;
   a receiver including a video reception section coupled to a video decoding section;
   and a device to identify more frequently and less frequently used values of a differential frame, identify symbols with lower and higher transmission energy, wherein said device to use differential frame construction by context prediction; and
   map the more frequently used values of the differential frame to symbols with lower transmission energy; and
   wherein said device to use differential frame construction by context prediction.

10. The transceiver of claim 9 wherein said device includes a table generator.

11. The transceiver of claim 9 wherein said device to use differential frame construction by differencing frames.

12. The transceiver of claim 9 wherein said device to identify the most frequently used values of a differential frame.

13. The transceiver of claim 9, said device to identify modulation symbols with the lowest transmission energy.

14. The transceiver of claim 9, said device to identify quadrature amplitude modulation symbols.

15. The transceiver of claim 9, said device to use a lossless/near lossless compression technique.

16. The transceiver of claim 9 wherein said device to use a table to identify the values of lower transmission energy and the differential frame with higher frequency.

17. The transceiver of claim 9 wherein said device to form a differential frame by predicting a value of a current pixel and calculating a prediction error for each pixel.

18. The transceiver of claim 9 wherein said device to map the source symbols of the differential frame with smaller amplitude to channel symbols with lower transmission energy.

\* \* \* \* \*